United States Patent
Hills

(10) Patent No.: US 7,309,430 B2
(45) Date of Patent: Dec. 18, 2007

(54) FILTRATION SYSTEM UTILIZING A SINGLE VALVE TO DIRECT FLUID STREAMS BETWEEN FILTER ASSEMBLIES AND CORRESPONDING METHODS

(75) Inventor: William H. Hills, Melbourne Village, FL (US)

(73) Assignee: Hills, Inc., West Melbourne, FL (US)

(*) Notice: Subject to any disclaimer, the term of this patent is extended or adjusted under 35 U.S.C. 154(b) by 292 days.

(21) Appl. No.: 10/296,249

(22) PCT Filed: Dec. 9, 2002

(86) PCT No.: PCT/US01/22533

§ 371 (c)(1),
(2), (4) Date: Jul. 10, 2003

(87) PCT Pub. No.: WO02/06028

PCT Pub. Date: Jan. 24, 2002

(65) Prior Publication Data

US 2004/0026339 A1   Feb. 12, 2004

Related U.S. Application Data

(60) Provisional application No. 60/218,810, filed on Jul. 18, 2000.

(51) Int. Cl.
*B01D 35/18* (2006.01)

(52) U.S. Cl. ............... 210/340; 210/419; 137/625.17; 137/625.13

(58) Field of Classification Search ............... 425/199; 210/340, 341, 347, 419, 424, 421, 423; 137/625.17, 137/625.12, 625.13, 625.25
See application file for complete search history.

(56) References Cited

U.S. PATENT DOCUMENTS

| | | | |
|---|---|---|---|
| 3,007,199 A | | 11/1961 | Curtis |
| 3,833,121 A | * | 9/1974 | Singleton et al. ............. 210/91 |
| 3,896,029 A | * | 7/1975 | Beuselinck ................. 210/341 |
| 3,940,222 A | * | 2/1976 | Zink .......................... 425/199 |
| 5,462,653 A | | 10/1995 | Hills |
| 5,928,523 A | | 7/1999 | Hobrecht et al. |
| 6,221,266 B1 | | 4/2001 | Wilkie et al. |
| 6,474,289 B1 | * | 11/2002 | Lilly et al. .............. 123/198 D |

FOREIGN PATENT DOCUMENTS

| | | | |
|---|---|---|---|
| DE | 3739614 A1 | * | 6/1989 |
| EP | 0 960 176 A1 | | 12/1999 |
| JP | 150672 A | | 6/1996 |
| JP | 08156072 | * | 6/1996 |

* cited by examiner

*Primary Examiner*—Terry K Cecil
(74) *Attorney, Agent, or Firm*—Edell, Shapiro & Finnan, LLC

(57) ABSTRACT

A filtration assembly for filtering polymer fluids at varying flow rates includes at least two filter housing assemblies releasably attached to a filter support or main block. Polymer fluid is delivered to the filter housing assemblies via an inlet passage in the main block, and filtered polymer fluid is transported from the filter housing assemblies to an outlet passage in the main block. One end of each filter housing assembly is attached to the main block and includes an inlet port for receiving polymer fluid from the inlet passage and an outlet port for delivering filtered polymer fluid to the outlet passage. A single valve disposed on the main block selectively alternates fluid flow between the main block and each filter housing assembly.

14 Claims, 5 Drawing Sheets

FILTRATION SYSTEM UTILIZING A SINGLE VALVE TO DIRECT FLUID STREAMS BETWEEN FILTER ASSEMBLIES AND CORRESPONDING METHODS

CROSS REFERENCE TO RELATED APPLICATIONS

This application claims priority from U.S. Provisional Patent Application Ser. No. 60/218,810, entitled "Polymer Filter," filed Jul. 18, 2000. The disclosure of this provisional patent application is incorporated herein by reference in its entirety.

BACKGROUND OF THE INVENTION

1. Field of the Invention

The present invention relates to purification and filtration of polymeric materials and, more particularly, to an improved method and apparatus for diverting flow of polymeric materials between at least two filter housing assemblies utilizing a single valve in a continuous polymer extrusion process.

2. Description of the Related Art

In processes involving extrusion of molten thermoplastic polymers such as polyethylene, Nylon, polyester, polystyrene, etc., it is necessary to filter foreign matter, e.g., contaminants and impurities, from the molten polymer. Two common examples of articles manufactured by molten polymer are synthetic textile fibers and thin plastic films of the type used in packaging or for tapes (e.g., computer tape, sound recording tape, etc.). In the production of synthetic textile fibers, which may have a final diameter of as little as ten microns, a particle of foreign matter of five or more microns diameter is quite likely to cause breakage of the fiber during manufacturing. It is desirable, therefore, to filter out any foreign material above a certain size.

In the manufacture of polymers for use in fiber production, a final step is often a pelletizing operation where a filter is used to remove any impurities from the final pellets. One form of impurity is a so-called "gel", a region in the molten polymer which has a much higher than average viscosity due to excessive polymer molecular weight or cross-linking of polymer molecules. For some articles, such as very thin film and textile fibers, gels in the molten polymer degrade the product quality and are desirably removed by filtration, either at the time the polymer is manufactured, or in-line in an extrusion process upstream of formation of the final product. It is further desirable to be able to replace dirty filter media with clean filter media without interrupting an extrusion process and without introducing air to the molten polymer fluid stream, since air introduced to the stream causes bubbles in the extruded article, rendering the article defective. A polymer filter having the capability of changing media without interrupting the extrusion operation is generally called a "continuous polymer filter" or "continuous screen changer".

Many polymer filtration systems are known in the art for removing impurities from molten polymer. One common type of polymer filter is a screen changer system. An example of a screen changer system is described in U.S. Pat. No. 3,007,199 to Curtis, the disclosure of which is incorporated herein by reference in its entirety. Screen changers typically have a relatively small area of screen for a given flow rate of molten polymer. A filter area of one square inch of screen for flow rates of thirty to seventy pounds per hour of polymer is typical of screen changers. For instance, an extruder of 4.5 inches screw diameter at full production can melt 600 to 1100 pounds per hour of polymer and is commonly fitted with a screen changer using screens of 4.5 inches diameter or 15.9 square inches of filter area. This yields a flow rate of approximately thirty-eight to sixty-nine pounds per hour per square inch of filter area. It would be very unusual but possible to use a screen changer with screens bigger than eight inches diameter on a 4.5 inch extruder. This would yield fifty square inches of area or twelve to twenty-two pounds per hour of polymer flow per square inch of filter area. In any case, screen changers of this type are suitable to remove dust, dirt, metal particles and pigment agglomerates down to a micron size of about forty, more often one hundred microns.

Gel removal, on the other hand, requires filtration by media having a micron rating of twenty or finer, and typically a greater "depth" or thickness of media is used than when merely removing dirt. Gels are amoeba-like in that they can change shape to pass through normal filter screens and then resume a more compact shape downstream of the screen. The combination of finer media and a greater thickness of media tends to cause a very high pressure drop through the filter unless a large area of filter media is used. For this reason, filters for gel removal normally have one square inch of filter area for each 0.20 to 0.70 pounds per hour of polymer flow. A filter used with a 3.5 inch diameter screw extruder having a melt rate of 350 pounds/hour would have a filter media area of about 1300 square inches, or nine square feet. These large area filters are not only useful for molten polymer, but also for solutions of polymer (so-called dopes). Polymer solutions (as used to make spandex or acrylic fibers) are lower in viscosity than polymer melts, so somewhat less filter area is needed to remove the gels that are common in these dopes. Also, filters for polymer solutions often operate at ambient temperature, making it unnecessary to heat the filter apparatus.

While many varying types of screen changers and other small area polymer filters exist, most large-area gel filters have a similar construction and utilize a candle filter system. A candle filter system typically has two or more filter housings and uses valves to direct polymer to and from the filter housings. Each housing typically contains multiple candle-type filter elements. The candle filter element is typically a perforated tube covered by pleated screen wire in two or more layers. The candle filter system is normally used for high polymer flow rate and/or very fine filtration systems. The size and number of candle filters are selected based upon the desired flow rate of polymer fluid to be processed. An example of a candle filter system is described in U.S. Pat. No. 3,833,121 to Singleton et al., the disclosure of which is incorporated herein by reference in its entirety. One popular candle size is 1.38" O.D. by 16" long and has 1.2 to 1.4 square feet of area, or about 9 square feet (1300 square inches) for seven candles. Such a filter can be used with a polymer flow rate of two hundred to one thousand pounds per hour, or 0.20 to 0.77 pounds per hour per square inch of area. This corresponds to the output of an extruder with a screw diameter of 2.5 to 4.5 inches.

U.S. Pat. No. 5,462,653 to Hills, the disclosure of which is incorporated herein by reference in its entirety, discloses another candle filtration system utilizing a single housing to filter polymer fluid. Briefly, the Hills system includes a generally cylindrically shaped housing with six candle-type filter assemblies arranged in pairs in a ring about a central valve and distribution system. A rotatable control plate controls the valve and distribution system and can be set in various positions to allow polymer flow through all of the filter assemblies or to prevent flow through individual pairs of filter assemblies while the other assemblies remain on-stream, in order to permit removal or replacement of clogged or dirty filters. While the system of Hills is useful in diverting polymer flow through various candle filter assemblies within a particular housing, the system does not disclose any mechanism for maintaining continuous filtration of polymer fluid in the event the entire filter housing needs to go off-stream for cleaning.

Many candle-type polymer filter systems maintain one of two filter housings operable or on-stream while the other is cleaned, installed and heated to be ready to accept the polymer when the filter medium in the on-stream housing becomes too dirty for continued operation. To switch housings, at least two valves are operated simultaneously (or nearly simultaneously) and polymer is introduced to the clean housing while flow continues through the dirty housing. An example of such a candle-type filter system is the Fluid Dynamics CPF system, which is manufactured by USF Filtration & Separation, Inc. This system has two filter housings and uses two sliding spool valves to direct the polymer flow to and from the filter housings. During normal operation, one of the two filter housings is on-stream (i.e., molten polymer is flowing therethrough) while the other filter housing is cleaned, installed and heated to be ready to accept the polymer. When the on-stream filter becomes too dirty for continued operation, spool valves of the system are set in motion in the following sequence: (1) the inlet valve of the clean filter housing is slightly opened while the outlet valve of the clean filter housing remains closed to allow the polymer fluid to enter and fill the clean housing; (2) the trapped air in the clean housing is purged through a bleed port until all air is vented from the clean housing; (3) after the clean housing is completely filled with molten polymer, the bleed port is closed and then the outlet valve of the clean housing is fully opened; and (4) the inlet valve of the clean housing is fully opened, after which the inlet and outlet valves of the dirty housing are completely closed. This completes the switching of the polymer fluid from the dirty housing to the clean housing, and the filter of the dirty housing can then be removed for cleaning or replacement. While the clean housing is being filled, the filter element in the dirty housing continues to provide uninterrupted process filtration.

One typical problem associated with typical candle filter systems is the lack of uniformity in the heating of candle housings. Another problem with candle filter systems, such as the CPF system described above, is the occurrence of excessive residence time for the polymer in the filter housings if the unit is operated well below its maximum flow capacity. Normally, the size of a polymer filtration system is chosen to provide sufficient filtration for the polymer process system at its maximum flow rate. The area of the filter media elements utilized to filter the polymer fluid will determine the polymer flow rate capacity suitable for the filter system. Under certain operating conditions or for certain processes, the process system maybe required to run at a reduced capacity, for example, in a process system having multiple functions or in systems producing plural-component polymer products. One problem resulting from running the process system at a reduced capacity or variable capacity is that the molten polymer remains within the filtration system for a relatively long period of time (i.e., the polymer has a high polymer "residence time").

Excessive residence time and non-uniform residence time can cause thermal degradation of the polymer, particularly when thermally sensitive polymers are used. For example, one type of synthetic fiber producing apparatus produces fibers with two polymer components, so-called bicomponent fibers. Such a machine would have an extruder and a filter for each polymer. If the machine were making a common type of bicomponent fiber with a core of one polymer and a sheath of another, it is desirable to be able to vary the percentage of sheath polymer for 10% to 60%, while the core would vary from 40 to 90%. In the case of the sheath, this is a 6 to 1 variation in polymer flow, causing excessive filter residence time when a thin sheath is being produced. To solve this problem, it is necessary to replace the filter housings with ones having less volume and fewer or shorter candle elements. Shorter elements require a shorter housing to reduce volume, but a shorter housing is not practical on all existing filter assemblies because the two valves and the polymer piping connected to the valves is a fixed distance apart and will only accommodate a housing of one specific length.

U.S. Pat. No. 6,221,266 to Wilkie et al., the disclosure of which is incorporated herein by reference in its entirety, discloses a continuous polymer filtration system that solves the problem of excessive residence time that occurs with varying polymer flow rates. The system in Wilkie et al. includes at least three independently controllable and removable filter housings that extend from a common inlet passage to a common outlet passage. Each filter housing includes a valve at its inlet and another valve at its outlet that may be opened or closed independently of the valves for the other housings. By manipulating various valves, the Wilkie et al. system is capable of diverting polymer fluid flow through different filter housings of the filtration system to effectively reduce excessive residence time when polymer flow rates change.

The Wilkie et al. system is similar to the CPF system and many other candle filter systems employing multiple filter housings in that multiple valves are utilized to control fluid flow within the system. The utilization of multiple valves to divert polymer fluid streams from one filter housing to another can be complicated. For example, operator error in switching polymer fluid flow between housings can cause polymer flow to be completely shut off to all housings, which stops flow from the extruder that delivers polymer to the filter system and causes a safety rupture disc typically installed at the exit of an extruder to rupture. In such situations, the entire process must be halted until the rupture disc is replaced.

Thus, it is desirable to provide a polymer filtration system capable of continuously filtering polymer streams at varying flow rates to filter housings while maintaining a desired polymer residence time within the filter housings. It is further desirable to minimize the risk of operator error and damage to the system when diverting polymer fluid streams between two or more filter housings.

SUMMARY OF THE INVENTION

It is an object of the present invention to reduce the complexity and manufacturing costs associated with diverting polymer fluid between filter housing assemblies during a continuous filtration process.

Another object of the present invention is to provide a filtration system that prevents complete valve cut-off of polymer flow through the filtration system thereby preventing any damage or interruption of polymer fluid flow within the system.

Yet another object of the present invention is to provide a filter system capable of filtering polymer fluids at various fluid flow rates while maintaining a desired polymer residence time within the filter housing assemblies of the filter system.

A further object of the present invention is to provide easily interchangeable filter housing assemblies having varying volumes and filter media areas to accommodate varying polymer flow rates through a filter system.

A still further object of the present invention is to maintain uniform heating of polymer fluid when directed through filter housing assemblies of a filtration system.

The aforesaid objects are achieved individually and in combination, and it is not intended that the present invention be construed as requiring two or more of the objects to be combined unless expressly required by the claims attached hereto.

According to the present invention, a polymer filtration system includes at least two filter housing assemblies in communication with an inlet passage that delivers polymer fluid into the system and an outlet passage transporting polymer fluid filtered by one of the filter housing assemblies out of the system. Each filter housing assembly includes one or more filter media elements. A single valve is manipulated to selectively divert polymer fluid from one filter housing assembly to the other. Each filter housing assembly has an inlet port and an outlet port disposed at one end of the assembly for receiving polymer fluid from the inlet passage and delivering filtered polymer fluid to the outlet passage via the valve. The filter housing assemblies are releasably secured to a surface of a filter support with their inlet and outlet ports adjacent the surface of the filter support, while the valve is disposed on an opposing surface of the filter support. The valve ensures that only one of the first and second filter housing assemblies receives polymer fluid from the inlet passage and delivers filtered polymer fluid to the outlet passage at a single time. The system permits the continuous filtering of polymer material by utilizing one of the first and second filter housing assemblies until cleaning is required. At such time, the valve diverts polymer fluid flow to the other of the first and second filter housing assemblies so that the first housing may be cleaned.

The system further facilitates the use of filter housing assemblies of varying sizes and shapes to accommodate varying polymer fluid flow rates while maintaining a desired fluid residence time within each housing. Since the inlet and outlet ports are located at the same end on each filter housing assembly, the lengths of filter housing assemblies may be easily modified to accommodate filter media (e.g., candle filters) of varying sizes without the need for modifying any of the other elements of the system, such as the filter support and valve. Additionally, each filter housing assembly may be easily equipped with suitable heating elements to maintain a desired uniform temperature of polymer fluid flowing through the assembly. The heating elements are further adaptable to accommodate varying filter housing assembly sizes.

The above and still further objects, features and advantages of the present invention will become apparent upon consideration of the following detailed description of a specific embodiment thereof, particularly when taken in conjunction with the accompanying drawings wherein like reference numerals in the various figures are utilized to designate like components.

DESCRIPTION OF THE PREFERRED EMBODIMENTS

In accordance with the present invention, a filtration system for filtering molten or solution polymer fluid streams includes at least two filter housing assemblies which extend from a single valve assembly that selectively provides fluid flow to at least one filter housing assembly. Each filter housing assembly typically includes one or more filter media elements that filter the fluid passing through the assembly. The filter housing assemblies may vary with respect to each other in size and number of filter media elements depending upon the residence time desired for polymer fluid flowing through a particular assembly. The individual controllability of the size and configuration of each filter housing assembly allows the polymer throughput capacity of the filtration system to be adjusted in accordance with the type of fiber processing system implemented (e.g., bicomponent fiber production, sheath-core fiber production, etc.).

Figure 1:
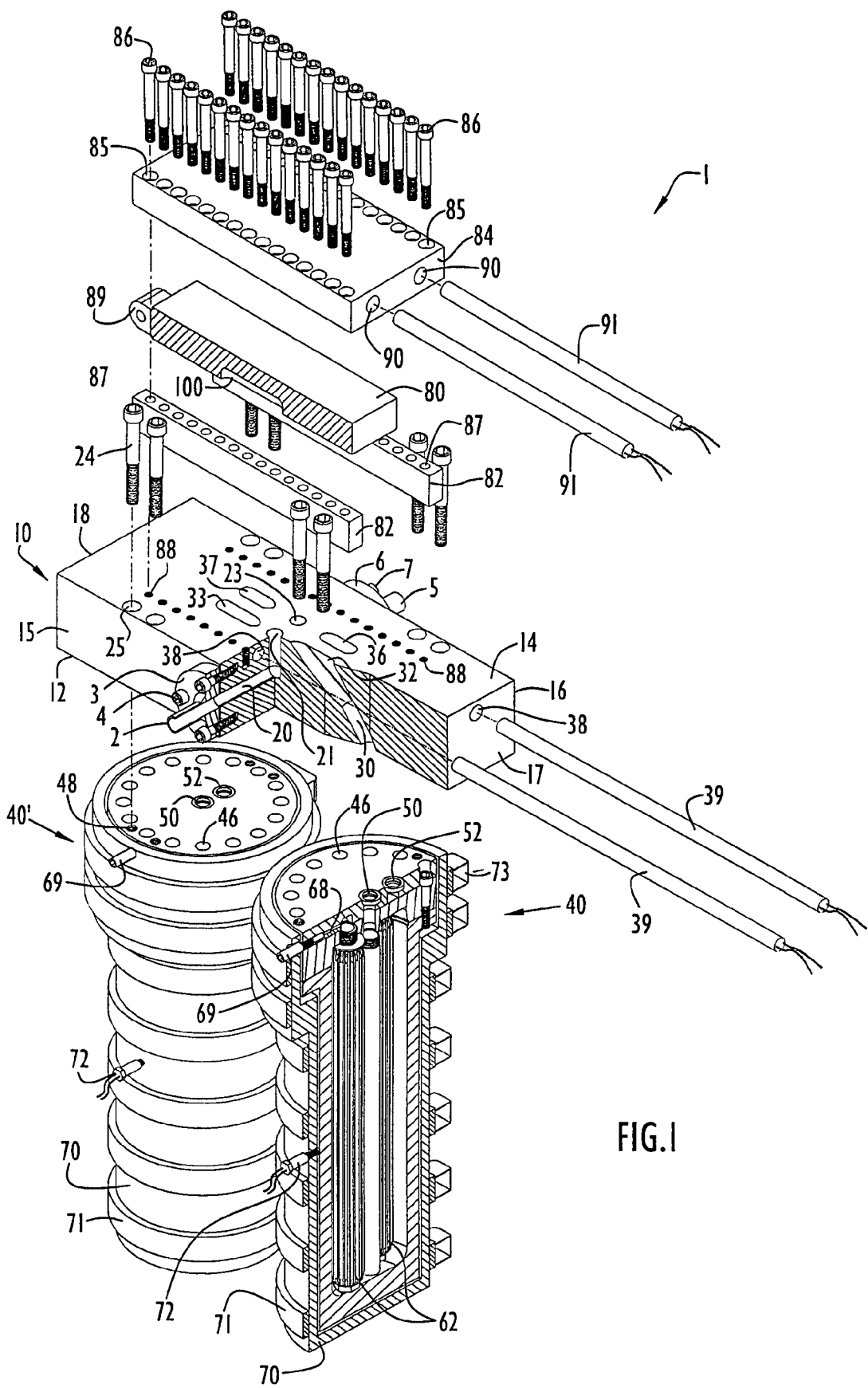
FIG. 1 is an exploded perspective view in partial section of a polymer filtration system utilizing a pair of filter assemblies in accordance with an exemplary embodiment of the present invention.

An exemplary embodiment of a continuous filtration system in accordance with the present invention is illustrated in FIGS. 1-10. Referring to FIG. 1, filtration system 1 includes a filter support structure in the form of a generally rectangular main block 10, a pair of generally cylindrical filter housing assemblies 40, 40' and a valve assembly connected to the main block. Unless indicated otherwise, components of the filtration system are typically constructed of a suitably rigid material (e.g., steel). In particular, the main block and components of the valve assembly are typically constructed of hard anti-galling and corrosion-resistant steel to facilitate smooth and relatively easy operation of the valve assembly as described below.

Main block 10 includes a lower surface 12 and an opposing upper surface 14, a front surface 15 and an opposing rear surface 16, and two opposing side surfaces 17, 18. The front and rear surfaces typically have a smaller surface area in comparison to the upper and lower surfaces, and the side surfaces typically have a smaller surface area in comparison to the front and rear surfaces. It is to be understood that the terms "upper", "lower", "front", "rear", "side", "horizontal", "vertical", "bottom", "upper", "lower", "length", "width" and the like are used herein merely to describe points of reference and do not limit the present invention to any specific orientation or configuration.

An inlet pipe 2 is connected to front surface 15 of the main block and is in fluid communication with an inlet passage 20 extending from the main block front surface into the main block. A flange 3 extends radially from the end of inlet pipe 2 adjacent the main block front surface. The flange secures the inlet pipe to the front surface of the main block via bolts 4 extending through the flange into the main block thereby ensuring a fluid tight relationship between the inlet pipe and the inlet passage of the main block. The inlet pipe delivers polymer to the main block for filtering by the system. Inlet passage 20 extends transversely from the main block front surface to an interior portion within the main block. At that interior portion, inlet passage 20 bends at an elbow, changing direction to extend transversely with respect to the main block upper and lower surfaces (i.e., vertically upward as shown in FIG. 1) and ultimately emerge at aperture 21 on upper surface 14 of the main block. An outlet passage 22 (see FIGS. 6, 8 and 10) extends from an aperture 23 on upper surface 14 of the main block to rear surface 16 of the main block in a substantially similar manner as inlet passage 20. The inlet and outlet apertures 21, 23 are typically aligned linearly with respect to each other in a direction transverse the longitudinal direction of the main block upper surface. An outlet pipe 5 is secured in a fluid tight relationship to the main block rear surface with a flange 6 and bolts 7. The outlet pipe is in fluid communication with outlet passage 22 and receives filtered polymer fluid from the main block for further processing.

Figure 2:
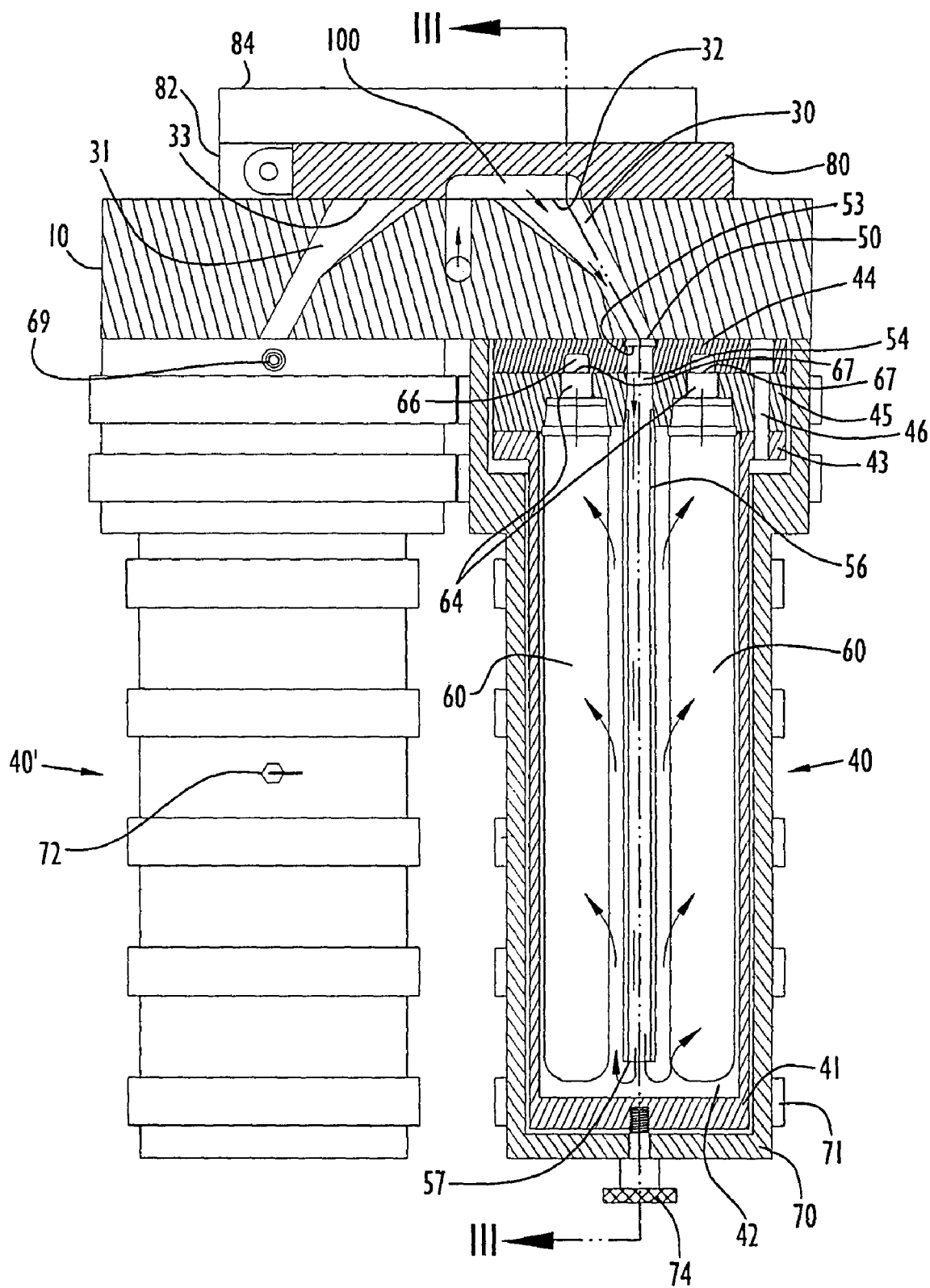
FIG. 2 is a front elevational view in partial section of the filtration system of FIG. 1.
Figure 3:
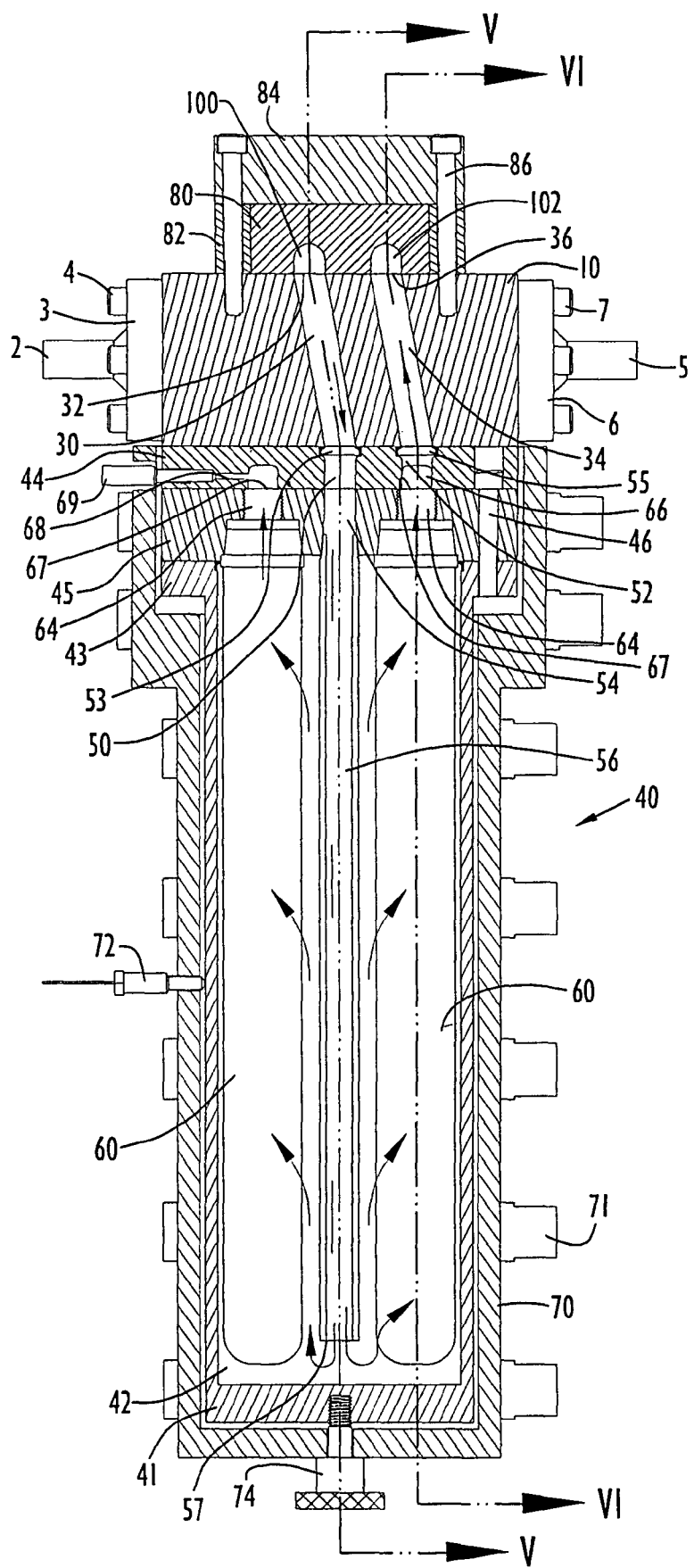
FIG. 3 is side elevational view in section of the filtration system of FIG. 1 taken along lines III-III of FIG. 2.

Referring to FIGS. 2 and 3, a pair of filter input channels 30, 31 extend within main block 10 between the main block upper and lower surfaces. Each filter input channel delivers polymer fluid from inlet passage 20 in the main block to a corresponding filter housing assembly as described below. Each filter input channel 30, 31 forms an elongated aperture 32, 33 on the main block upper surface. Elongated apertures 32, 33 are essentially slot-shaped openings having a generally "race track" geometry with the longer or longitudinal dimension of each aperture extending in the longitudinal direction of the main block upper surface and the transverse edges being rounded. Elongated apertures 32, 33 are further separated a suitable distance from each other in the longitudinal direction of the main block upper surface, with aperture 21 of inlet passage 20 disposed therebetween such that all three apertures 21, 32, 33 are in substantial linear alignment with each other in the longitudinal direction. Each filter input channel 30, 31 also forms a generally circular aperture on the main block lower surface. The filter input channels are angled to extend away from each other in a downward direction within the main block such that the channel apertures on the main block lower surface have a greater spacing in comparison to the spacing between the elongated channel apertures on the main block upper surface. The filter input channel apertures on the main block lower surface are suitably spaced from each other to facilitate alignment of inlet bores on filter housing assemblies with such apertures as described below.

A pair of filter output channels 34, 35 (see FIGS. 6, 8 and 10) extend in a substantially similar manner in main block 10 as filter input channels 30, 31 to deliver filtered polymer fluid from the filter housing assemblies to outlet passage 22 in the main block. Specifically, each of the filter output channels 34, 35 extends between the main block upper and lower surfaces, forming an elongated aperture 36, 37 on the main block upper surface and a generally circular aperture on the main block lower surface. The elongated apertures 36, 37 of filter output channels 34, 35 are essentially slot-shaped openings having a generally "race track" geometry with the longer or longitudinal dimension of each elongated aperture extending in the longitudinal direction of the main block upper surface and the transverse edges being rounded. Elongated apertures 36, 37 are separated a suitable distance from each other in the longitudinal direction of the main block upper surface with aperture 23 of outlet passage 22 disposed therebetween such that all three apertures 23, 36, 37 are in substantial linear alignment with each other in the longitudinal direction. Filter output channels 34, 35 extend away from each other in the downward direction within the main block and in a substantially similar manner as filter input channels 31, 32 such that the filter output channel apertures on the main block lower surface have a greater spacing in comparison to the spacing between the filter output channel elongated apertures on the main block upper surface. The filter output channels apertures on the main block lower surface are further suitably spaced from each other to facilitate appropriate alignment of outlet bores on filter housing assemblies with such apertures as described below.

The apertures are aligned on the main block upper surface such that a filter input channel elongated aperture 32, 33 is aligned with a respective filter output channel elongated aperture 36, 37 in a direction transverse the longitudinal direction of the main block upper surface. Additionally, the inlet passage aperture 21 is aligned with the outlet passage aperture 23 in the direction transverse the longitudinal direction of the main block upper surface. For reasons that will be explained below, the longitudinal dimensions of elongated apertures 36, 37 of filter output channels 34, 35 are preferably smaller than the longitudinal dimensions of elongated apertures 32, 33 of filter input channels 30, 31.

Electrical heating elements are disposed within the main block to heat the main block to a desired temperature. Specifically, heating channels 38 formed within main block 10 extend between side surfaces 17, 18 of the main block and are suitably dimensioned to receive heating rods 39. The heating rods include wiring connecting to a controller (not shown) for controlling the heating of the rods and thus the temperature of the main block. It is noted that any number of heating elements may be disposed at any locations on or in the main block to maintain the main block at a desired temperature.

Referring again to FIG. 2, filter housing assemblies 40, 40' of the filtration system include a plurality of filter media elements for filtering polymer fluid streams. Although both filter housing assemblies are substantially similar in size and configuration in the illustrated embodiment, it is noted that filter housing assemblies utilized in the present invention may vary in size, shape, number of filter media elements, etc. depending upon the desired flow rate capacity through a particular filter housing assembly for a particular process. Each filter housing assembly 40, 40' includes a housing head secured to a generally cylindrical hollow housing 41 having a chamber 42 disposed therein. The housing head is formed by a generally circular upper plate 44 attached to a generally circular lower plate 45. Lower plate 45 attaches to an upper portion of housing 41. Upper and lower plates 44, 45 may be connected in any suitable manner that ensures a fluid-tight relationship between the plates. For example, the plates may be brazed together or bolted together with a flat gasket sandwiched between their adjacent surfaces. Alternatively, the housing head may include a single circular plate having the combined features of the upper and lower plates. The housing head is secured to housing 41 in a fluid tight relationship via a plurality of bolts 46 extending through both plates 44, 45 and threadably engaging with a flange 43 extending radially from the upper portion of the housing (see FIGS. 1 and 2). Each filter housing assembly 40, 40' is secured to lower surface 12 of the main block with two pairs of bolts 24. Specifically, the two pairs of bolts 24 extend through the main block upper and lower surfaces via bore holes 25 and engage with corresponding threaded apertures 48 on an upper surface of each filter housing assembly upper plate 44 to secure each filter housing assembly to a portion of the main block lower surface.

Upper plate 44 of each filter housing assembly 40, 40' includes a generally circular inlet bore 50 and a generally circular outlet bore 52. Inlet bore 50 is typically located at or near the center of the upper plate so as to be concentrically aligned and in fluid communication with the aperture formed by one of the filter input channels 30, 31 on the main block lower surface when each filter housing assembly is bolted to the main block. Outlet bore 52 is offset from inlet bore 50 and is positioned to be concentrically aligned and in fluid communication with the aperture formed by one of the filter output channels 34, 35 on the main block lower surface upon connection of each assembly to the main block. A metal seal 53 disposed within inlet bore 50 near the upper surface of upper plate 44 prevents any leakage between the upper plate and the main block lower surface as polymer fluid travels from a corresponding filter input channel 30, 31 of the main block to inlet bore 50. Similarly, a metal seal 55 is disposed within outlet bore 52 near the upper surface of upper plate 44 to prevent leakage of filtered polymer fluid traveling from the outlet bore to a corresponding output channel 34, 35 of the main block. The upper plate inlet bore is in concentric alignment and fluid communication with a central bore 54 extending through lower plate 45, which is in turn in concentric alignment and fluid communication with a generally cylindrical hollow pipe 56 extending within housing chamber 42. Hollow pipe 56 extends substantially the entire length of the housing chamber and terminates at a pipe outlet 57 near a bottom portion of the housing chamber. The travel path of polymer fluid within each filter housing assembly 40, 40' is depicted by arrows in FIGS. 2 and 3. Specifically, polymer fluid enters each filter housing assembly 40, 40' by passing from a corresponding filter input channel 30, 31 into concentrically aligned inlet bore 50 of upper plate 44. The polymer fluid continues to travel from the upper plate inlet bore through central bore 54 of lower plate 45 and into pipe 56, where the fluid exits through pipe outlet 57 at the bottom portion of housing chamber 42.

Figure 4:
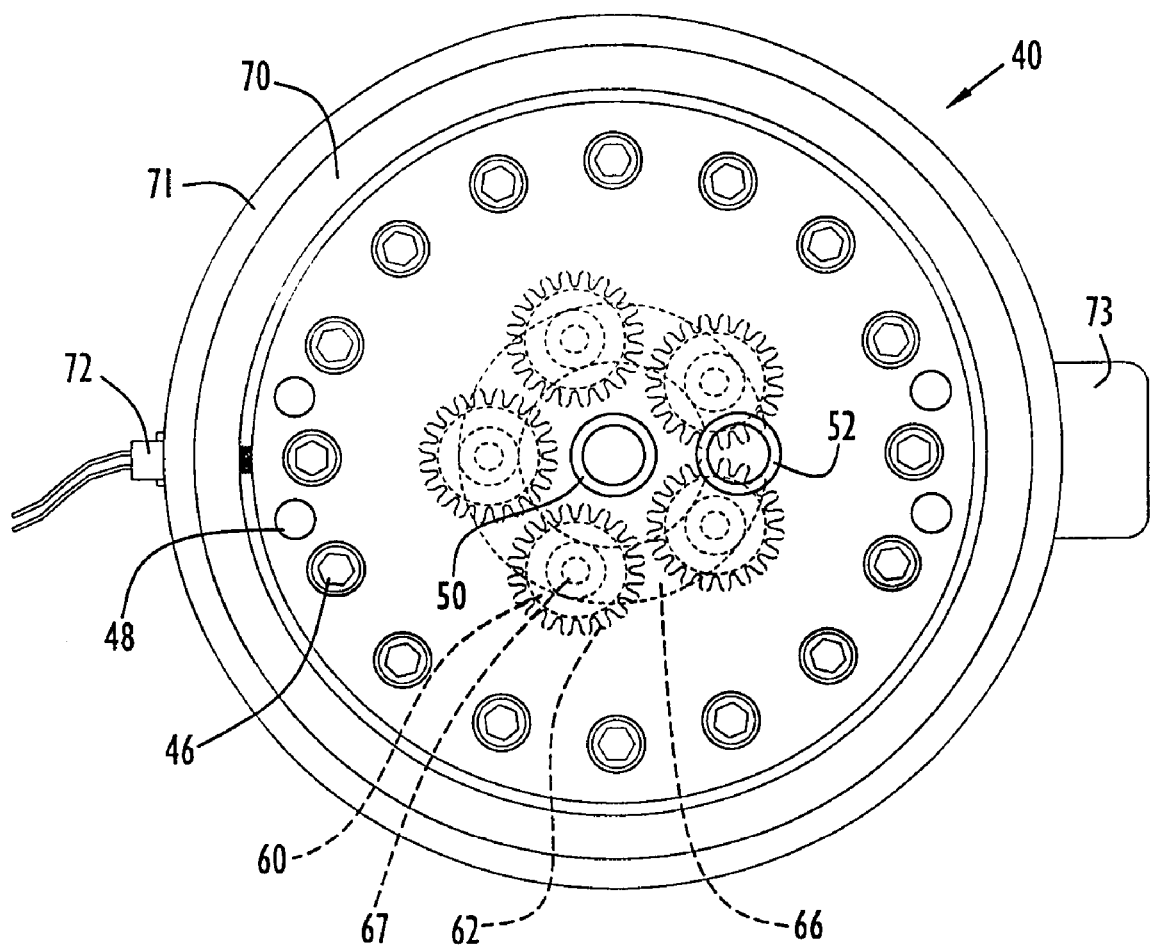
FIG. 4 is a top plan view in partial section of a filter housing assembly of the polymer filtration system of FIG. 1.

A plurality of filter media elements are disposed around pipe 56. The filter media elements are typically candle filters 60 that are generally cylindrical, perforated and hollow and that extend substantially the entire length of the housing chamber. Screen wire 62 surrounds each candle filter 60 and is typically pleated as indicated in FIGS. 1 and 4. It is noted that the screen wire is not depicted in FIGS. 2 and 3 to simplify the view and clearly show the fluid travel path within the filter housing assembly. In the embodiment depicted in the drawings, each filter housing assembly 40, 40' includes five candle filters 60 disposed in an array around pipe 56 within housing chamber 42. In general, any number of candle filters or other filter media elements (e.g., one filter media element) may be utilized, and the invention is not limited to the illustrated configuration of filter elements. Polymer fluid exiting pipe outlet 57 proceeds to travel within the housing chamber through pleated screen wire 62 and into candle filters 60 at varying locations along each candle filter, as indicated by the arrows in FIGS. 2 and 3. Upon passing through the screen wire and entering the hollow portion of a corresponding candle filter, the polymer fluid is filtered and continues traveling within the candle filter hollow portion toward the housing head. Since the pressure drop through the screen wire is high and the pressure drop due to flow inside the housing chamber is low, polymer fluid will tend to flow nearly equally through all areas of the surface of all the candle filters.

It is noted that each filter housing assembly is functional without a pipe to deliver polymer fluid from the housing head to a bottom portion of the housing chamber. However, without the pipe, polymer flow rates into the housing chamber from the inlet bore in the housing head would become too slow as the polymer approached the ends of the candle filters near the bottom of the housing chamber. The slow flowing polymer fluid would create a region of stagnant polymer subject to thermal degradation near the bottom portion of the housing chamber. Thus, the pipe in each filter housing assembly conveys all of the incoming polymer fluid to the bottom end of the housing, avoiding excessively slow polymer flow near the bottom end of the candle filters and avoiding any stagnant regions.

Each filter media element is typically secured at an upper end to lower plate 45 within each filter housing assembly. As indicated in FIGS. 2 and 3, lower plate 45 includes an array of threaded candle holder bores 64, each aligned to engage with a threaded upper end of a corresponding candle filter 60. All of the candle holder bores are further aligned and in fluid communication with a ring cavity 66 disposed on the surface of upper plate 44 that is adjacent lower plate 45. The ring cavity forms an annular channel on the surface of the upper plate that does not extend to the opposing surface of the upper plate (i.e., the surface adjacent the main block lower surface). Each of the upper ends of candle filters 60 includes a candle outlet aperture 67 (FIG. 4) that is aligned and in fluid communication with the ring cavity. A portion of ring cavity 66 is further aligned and in fluid communication with outlet bore 52 of the upper plate. Thus, filtered polymer fluid traveling through each candle filter 60 will exit candle outlet aperture 67 and proceed into ring cavity 66 of the upper plate. The filtered polymer fluid will then continue to travel within ring cavity 66 until reaching upper plate outlet bore 52, where the filtered polymer fluid then passes through the upper plate outlet bore and into a corresponding, filter output channel 34, 35 within main block 10.

Each filter housing assembly also includes a bleed line for removing unwanted air from the filter housing chamber prior to allowing filtered polymer fluid to travel beyond the main block. Specifically, the bleed line includes a bleed passage 68 extending from a portion of ring cavity 66 within upper plate 45 to an exposed portion of the cylindrical outer surface of the upper plate (see FIGS. 1 and 3). A bleed plug 69 extends from the exposed portion of the upper plate and is removably secured (e.g., via threaded or other engagement) in a fluid tight relationship with bleed passage 68. During initial use of either filter housing assembly 40, 40', polymer fluid is allowed to enter the filter housing chamber from the main block as described above, but prevented from leaving the main block, by adjusting the valve assembly in a manner described below, until substantially all the air within the filter housing chamber is forced out through the bleed line. Specifically, bleed plug 69 is disengaged from bleed passage 68 a sufficient amount to open the bleed line and allow polymer fluid entrained with air to exit the filter housing assembly via the bleed passage. When polymer fluid exiting the filter housing assembly via the bleed passage is determined to be free of bubbles (i.e., indicative of all air being evacuated from the filter housing chamber), the bleed plug is appropriately secured within the bleed passage to re-establish a fluid tight relationship. Polymer fluid is then permitted to pass from the main block via a filter output channel 34, 35 by adjusting the valve assembly as described below.

A generally cylindrical heating jacket 70 surrounds each filter housing assembly to maintain the temperature of polymer fluid within the filter housing chambers. The heating jacket is constructed of a good heat conducting material (e.g., aluminum) and may further be surrounded by insulation (not shown) to reduce heat loss from the filter housing assembly. Concentric band heaters 71 are wrapped around the heating jackets and secured thereto with brackets 73, and each heating jacket is removably secured to a corresponding filter housing assembly via a bolt 74 attaching the bottom surface of the heating jacket to filter housing 41. A temperature sensor 72 (e.g., a thermocouple) extends through heating jacket 70 and is positioned in close proximity to filter housing 41. Electrical power is supplied to band heaters 71 and typically controlled by a remote temperature controller (not shown) based upon temperature signals the temperature controller receives from temperature sensor 72. Thus, the temperature within a filter housing chamber may be precisely maintained at a desired temperature during use of the filter housing assembly.

The valve assembly for system 1 utilizes a single valve to selectively divert polymer fluid flow from at least one filter housing assembly to another. Referring again to FIG. 1, the valve assembly includes a generally rectangular slide valve 80 disposed adjacent upper surface 14 of main block 10 between a pair of generally rectangular rails 82. The slide valve and rails each have a longer dimension extending in the longitudinal direction of the main block upper surface. A generally rectangular valve cap 84 overlies the slide valve and rails and secures the slide valve between the rails and between the valve cap and the main block upper surface. Heating channels 90 extend longitudinally within and between opposing side surfaces of the valve cap. The heating channels are suitably dimensioned to receive heating rods 91. The heating rods include wiring that typically connect to a controller (not shown) for controlling heating of the rods and thus the temperature of the valve cap. It is noted that any number of heating elements may be disposed at any locations on or in the valve cap to maintain the valve cap at a desired temperature. It is further noted that the controller utilized for heating the valve cap may be the same controller utilized for heating the main block and/or the filter housing assemblies.

Valve cap 84 includes two sets of bore holes 85 positioned longitudinally along the edges of the valve cap that extend beyond the shorter dimension of slide valve 80 when the valve cap is positioned over the slide valve. Bore holes 85 extend through the valve cap between the valve cap upper and lower surfaces and are concentrically aligned with corresponding bore holes 87 extending through rails 82 and two sets of longitudinally aligned threaded apertures 88 disposed on the main block upper surface. A plurality of bolts 86 extend through the bore holes on the valve cap and rails and threadingly engage with the threaded apertures on the main block upper surface to secure the valve cap and rails to the main block upper surface. The two sets of threaded apertures on the main block are suitably spaced from each other to provide a snug fit for the slide valve when the rails are bolted to the main block upper surface while permitting movement of the slide valve between the rails in the longitudinal direction of the main block. The slide valve and rails are also typically dimensioned to be substantially flush at their surfaces facing the valve cap and the main block upper surface when secured to the main block so as to ensure a fluid tight relationship between the slide valve and the main block during operation of the valve assembly. One skilled in the art will recognize that the degree of tightening of bolts 86 as well as the dimensions of slide valve 80, rails 82 and/or valve cap 84 can be adjusted within selected tolerances to facilitate a desired frictional resistance to movement of the slide valve between the rails, valve cap and main block upper surface while maintaining a fluid tight relationship between the slide valve and the main block. An eyelet 89 or similar connector is affixed at a longitudinal end of the slide valve to permit attachment of the slide valve to a mechanical (e.g., hydraulic or screw-type) device for facilitating movement of the slide valve. The mechanical device may be automated or manually operated.

Slide valve 80 includes a pair of elongated pockets or grooves 100, 102 disposed and longitudinally oriented on the surface of the slide valve adjacent upper surface 14 of main block 10. Groove 100 is appropriately aligned on the slide valve surface to correspond with linearly aligned apertures 21, 32, 33 of inlet passage 20 and filter input channels 30, 31, respectively, on the main block upper surface when the slide is received between the rails. Similarly, groove 102 is appropriately aligned on the slide valve surface to correspond with linearly aligned apertures 23, 36, 37 of outlet passage 22 and filter output channels 34, 35, respectively, on the main block upper surface when the slide valve is received between the rails. The dimensions and/or positioning of each groove are further selected such that only two immediately neighboring apertures in a linear alignment of apertures are in fluid communication with a corresponding groove at selected positions of the slide valve on the main block upper surface.

Figure 5:
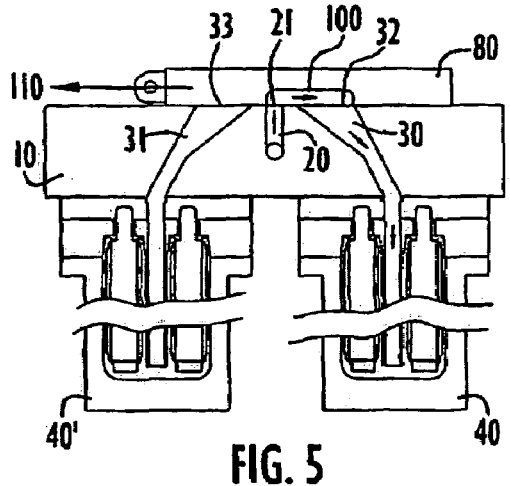
FIGS. 5, 7 and 9 are broken front elevational views in section of the filtration system of FIG. 1 taken along lines V-V of FIG. 3, wherein the valve is positioned at varying locations on the main block of the system.
Figure 6:
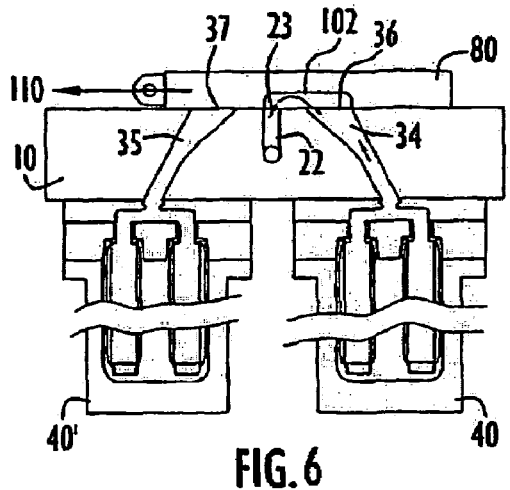
FIGS. 6, 8 and 10 are broken front elevational views in section of the filtration system of FIG. 1 taken along lines VI-VI of FIG. 3, wherein the valve is positioned at varying locations on the main block of the system.
Figure 7:
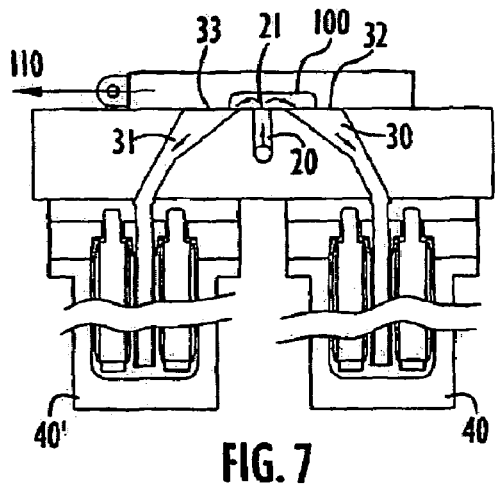
Figure 8:
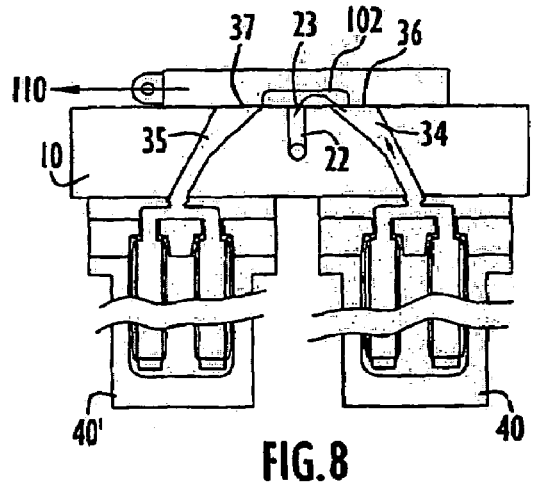
Figure 9:
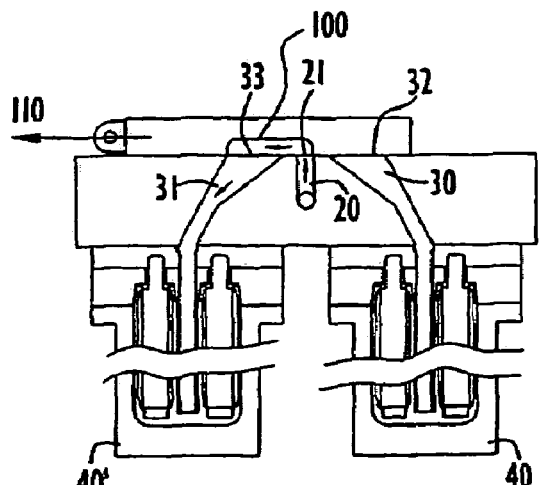
Figure 10:
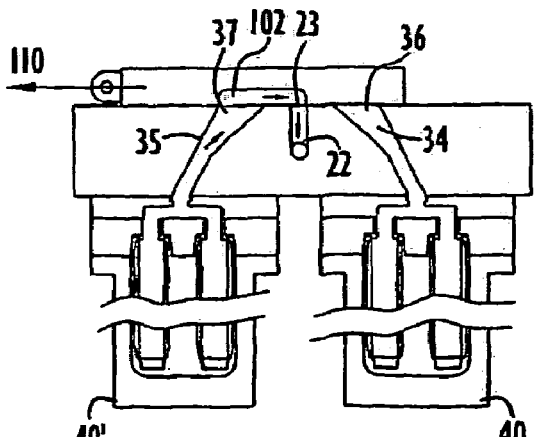

The positioning of slide valve 80 at varying locations along the main block upper surface so as to align grooves 100, 102 with selected apertures is illustrated in FIGS. 5-10. It is initially noted that FIGS. 5, 7 and 9 illustrate a cross-sectional view of system 1 taken along lines V-V of FIG. 3, whereas FIGS. 6, 8 and 10 illustrate a cross-sectional view of the system taken along lines VI-VI of FIG. 3. For the purpose of simplicity, the valve cap is not shown in any of FIGS. 5-10. As depicted in FIGS. 5 and 6, slide valve 80 maybe positioned along main block upper surface 14 such that groove 100 of the slide valve is aligned and in fluid communication only with aperture 21 of inlet passage and aperture 32 of filter input channel 30 on the main block, and groove 102 of the slide valve is aligned and in fluid communication only with aperture 23 of outlet passage 22 and aperture 36 of filter output channel 34 on the main block. The valve position of FIGS. 5 and 6 allows polymer fluid to flow into and out of filter housing assembly 40 but prevents any flow of polymer fluid into or out of filter housing assembly 40'. The slide valve may also be positioned as depicted in FIGS. 9 and 10, wherein groove 100 is aligned and in fluid communication only with aperture 21 of inlet passage 20 and aperture 33 of filter input channel 31, and groove 102 of the slide valve is aligned and in fluid communication only with aperture 23 of outlet passage 22 and aperture 37 of filter output channel 35. The valve position of FIGS. 9' and 10 allows polymer fluid to flow into and out of filter housing assembly 40' but prevents any flow of polymer fluid into or out of filter housing assembly 40. Thus, the slide valve can be selectively positioned to control flow of polymer fluid exclusively through one of the two filter housing assemblies. Further, the slide valve can be easily repositioned on the main block upper surface (e.g., by sliding the slide valve in the direction of arrow 110) to divert polymer fluid flow from one filter housing assembly (e.g., assembly 40) to another (e.g., assembly 40').

As previously noted, the longitudinal dimensions of apertures 36, 37 of filter output channels 34, 35 are typically smaller than the longitudinal dimensions of apertures 32, 33 of filter input channels 30, 31. Dimensioning of apertures 36, 37 in such a manner provides additional fluid control positions for the valve. Specifically, the valve may be adjusted to an intermediate position wherein groove 100 is in fluid communication with all three apertures 21, 32, 33 of inlet passage 20 and filter input channels 30, 31, respectively, whereas groove 102 is in fluid communication only with aperture 23 of outlet passage and one of apertures 36, 37 of filter output channels 34, 35, respectively. An example of one such intermediate position is depicted in FIGS. 7 and 8. Specifically, slide valve 80 is positioned along main block upper surface 14 such that groove 100 is in fluid communication with all three apertures 21, 32, 33 (FIG. 7), whereas groove 102 is in fluid communication only with apertures 23, 36 (FIG. 8). Thus, the valve configuration depicted in FIGS. 7 and 8 for system 1 allows polymer fluid entering the main block from inlet pipe 2 to travel from inlet passage 20 to both filter input channels 30, 31 and enter both filter housing assemblies 40, 40' at the same time. However, while filtered polymer fluid is allowed to pass from one filter housing assembly 40 into outlet passage 22 via filter output channel 34, the other filter housing assembly 40' is prevented from delivering filtered polymer fluid to outlet passage 22 because its corresponding filter output channel 35 is not in fluid communication with the outlet passage in the main block. The slide valve may be further adjusted in the direction of arrow 110 so that groove 100 is still in fluid communication with all three apertures 21, 32, 33, but now groove 102 is in fluid communication only with apertures 23, 37. In other words, in such a position the slide valve permits filtered polymer fluid to leave filter housing assembly 40' via filter output channel 35 but prevents filtered polymer fluid from leaving filter housing assembly 40 via filter output channel 34. This feature of the present invention permits air to be removed from any filter housing assembly during its initial use, utilizing its bleed line as described above, while preventing filtered polymer fluid from leaving that filter housing assembly. Once it has been established that the filtered housing assembly is free of entrapped air (i.e., polymer fluid exiting the bleed line is free of bubbles), the slide valve, may be shifted into suitable alignment as described above to allow filtered polymer fluid to exit the filter housing assembly.

The valve assembly may further include a valve location indicator to indicate the flow of polymer fluid through the filter housing assemblies based upon the position of the valve as described above. For example, in situations where the slide valve is manually operated, indicia (e.g., an arrow) that corresponds to the longitudinal position of the slide valve on the main block upper surface may be aligned with other indicia (e.g., bars on a linear scale) to provide an indication as to the precise position of the slide valve grooves with respect to the apertures on the main block. Alternatively, an electronic position indicator may be implemented. An electronic position indicator is particularly suitable in situations where the slide valve is automated.

Operation of system 1 will now be described with the valve assembly initially positioned to direct flow exclusively into and out of filter housing assembly 40 (i.e., the slide valve position depicted in FIGS. 5 and 6). Slide valve 80 is positioned on the main block upper surface such that groove 100 is aligned and in fluid communication only with aperture 21 of inlet passage 20 and aperture 32 of filter input channel 30 of the main block. Similarly, groove 102 is aligned and in fluid communication only with aperture 23 of outlet passage 22 and aperture 36 of filter output channel 34 of the main block. During operation, main block 10, valve cap 84 and housing assembly 40 are typically heated to a desired temperature prior to directing polymer fluid through system 1. Each of the main block, valve cap and housing assembly may be heated via their respective heating rods or heating jacket. Upon achieving a desired temperature, polymer fluid is delivered under pressure by inlet pipe 2 into inlet passage 20 at front surface 15 of main block 10. Polymer fluid travels through inlet passage 20 and exits aperture 21 at upper surface 14 of the main block, passes through groove 100 of slide valve 80 and into filter input channel 30 via aperture 32 on the main block upper surface. Filter input channel 30 delivers the pressurized polymer fluid to the housing head of filter housing assembly 40, where the polymer fluid passes from the main block through inlet bore 50 of upper plate 44 and central bore 54 of lower plate 45 to enter hollow pipe 56 within housing chamber 42 of filter housing assembly 40. The polymer fluid is filtered by traveling through candle filters 60 within the housing chamber in the manner described above. The filtered polymer fluid exits each candle filter 60 via candle outlet aperture 67 and enters ring cavity 66 in upper plate 44. The ring cavity directs the flow of filtered polymer fluid into outlet bore 52 of the upper plate, which in turn leads to filter output channel 34 in the main block. The filtered polymer fluid travels through filter output channel 34 and emerges from aperture 36 into groove 102 in the slide valve. Groove 102 directs filtered polymer fluid into outlet passage 22 via aperture 23 on the main block upper surface, and the filtered polymer fluid travels through the outlet passage and exits the main block at its rear surface 16. The filtered polymer fluid enters outlet pipe 5 and is carried away from the filtration system for further processing.

Once the candle filters within filter housing assembly 40 become sufficiently clogged with material (e.g., dirt, impurities, gels, etc.) removed from polymer fluid streams passing through the walls of the filters, polymer fluid flow may be diverted to filter housing assembly 40' to facilitate removal of filter housing assembly 40 for cleaning and replacement of a new filter housing assembly on the main block. Filter housing assembly 40' is typically heated to the desired temperature, utilizing its heating jacket 70, temperature sensor 72 and a suitable controller, prior to diverting polymer fluid into the assembly. Slide valve 80 is then shifted longitudinally along the main block upper surface as described above from an initial position illustrated in FIGS. 5 and 6 to an intermediate position illustrated in FIGS. 7 and 8. At the intermediate position (FIGS. 7 and 8), polymer fluid flows from groove 100 of slide valve 80 into both filter input channels 30, 31 in main block 10 leading to both filter housing assemblies 40, 40'. However, the slide valve at such intermediate position permits filtered polymer fluid to leave only filter housing assembly 40 by passing into groove 102 of the slide valve via filter output channel 34 in the main block. Any air entrapped in housing chamber 42 of filter housing assembly 40' can be evacuated via the bleed line for the assembly in a manner described above while the slide valve is in its intermediate position. Upon sufficient removal of air entrapped within filter housing assembly 40', polymer fluid flow is completely diverted from filter housing assembly 40 to filter housing assembly 40' by further shifting slide valve 80 in a manner described above and illustrated in FIGS. 9 and 10. At such valve position, polymer fluid flows exclusively into and out of filter housing assembly 40', allowing filter housing assembly 40 to be removed from system 1 for cleaning.

The removal of filter housing assembly 40 is typically implemented by disconnecting its heating jacket 70, including its band heaters 71 and temperature sensor 72, from the controller. The bleed line for the assembly may be opened prior to removing the assembly from the main block to ensure that polymer fluid remaining in the filter housing chamber is not under any significant pressure. Heating jacket 70 may optionally be kept on the assembly to ensure the polymer remains fairly hot and fluid within the filter housing chamber for easy removal. Alternatively, the heating jacket may be easily removed by disengaging bolt 74 from filter housing 41. Candle filters 60 within the filter housing chamber may be removed and the filter housing and candle filters may be cleaned in any suitable manner (e.g., using a furnace, salt bath, boiling solvents, etc.).

During continued operation, a new filter housing assembly may be installed at the open location on main block 10. Upon accumulation of a sufficient amount of filtered material from polymer fluid flowing through filter chamber 42 of filter housing assembly 40', the slide valve may be shifted to another intermediate valve position to facilitate air evacuation of the new filter housing assembly, followed by further shifting of the slide valve to completely divert polymer fluid flow to the new filter housing assembly thereby facilitating the removal and cleaning of filter housing assembly 40'.

Thus, the filtration system of the present invention is capable of continuous and uninterrupted operation by diverting fluid flow between filter housing assemblies with the manipulation of a single valve rather than multiple valves as is required in other systems with multiple filter housing assemblies. Additionally, the system always maintains polymer flow through at least one filter housing assembly during operation of the valve, thereby eliminating any possibility of pressure buildup and extruder damage caused by operator error when adjusting the valve.

Furthermore, filter housing assemblies having differing flow rate capacities maybe easily replaced within the system depending upon the flow requirements for a particular process. In most applications, the longest candle that would normally be used would have a length about 15 times its diameter. For example, a candle filter with a diameter of about 2 inches would typically have a length no longer than about 30 inches. Such a candle with pleated screens would have a screen area of about 5 square feet or 720 square inches. Assuming a reduction to 20% of the area was required due to a decrease in flow rate for polymer to be processed, the 2 inch diameter candle could be reduced to about 6 inches in length. The filter housing assembly of the present invention could be easily modified to retain candle filters or other filter media of varying sizes while still being suitable for use with the system.

Modification of the filter housing assembly may be easily accomplished by separating the hollow housing portion from the housing head and replacing that housing with a new housing having a reduced size (e.g., length) to accommodate a desired volume of fluid to be filtered. The new housing including smaller sized candle filters may be attached to the housing head and the filter housing assembly reconnected to the main block. The heating jacket surrounding the housing may also be removed and reattached to the new housing with the same bolt or a longer bolt depending upon the size of the new housing. Thus, the filtration system of the present invention with the single valve assembly and housing head design facilitates simple, convenient and economic modification of fluid filtration capacity by replacement of the relatively inexpensive housing portion of the filter housing assembly without any modification to the relatively expensive housing head portion. Additionally, the system design allows a single heating jacket to be utilized for a variety of filter housing assembly sizes. In contrast, conventional continuous filtration systems employing multiple valves typically utilize filter housing assemblies with a housing head at each end that secures to a valve. Those conventional systems require their filter housing assemblies to be of a specific length so that each housing head may appropriately align with a valve disposed at a fixed location within the system. Modification of the size of filter housing assemblies in those systems would require a significant modification to the system itself.

It is to be understood that the embodiments described above and illustrated in the drawings represent only a few of the many ways of implementing a filtration system utilizing a single valve to direct fluid streams between filter housing assemblies.

The filter housing assemblies may be made of any suitable materials and may have any suitable configuration rendering a desirable fluid flow capacity for a particular polymer process. It is noted that the system has been described and displayed with two filter housing assemblies for illustrative purposes only, and the filtration system of the present invention may utilize any number of filter housing assemblies. For example, a system contemplated by the present invention may include any number of pairs of filter housing assemblies appropriately aligned with a single valve such that manipulation of the valve effects a diverting of polymer fluid from one filter housing assembly to another in each pair. In another example, the system may include a linear array of filter housing assemblies disposed in appropriate alignment with a single valve such that manipulation of the valve effects a diverting of polymer fluid from one filter housing assembly to an adjacent filter housing assembly in the linear array. In yet another example, the system may utilize a single valve to divert fluid flow between one filter housing assembly and two or more filter housing assemblies. Additionally, the filter housing assemblies may be oriented in any suitable manner (e.g., horizontally, vertically, etc.) with respect to the filter support structure and may be aligned in any suitable relationship (e.g., parallel or non-parallel alignment) with respect to each other. The filter housing assemblies may be of varying sizes and/or may have filter media elements with varying surface areas to accommodate varying polymer flow rates while maintaining suitable residence time of polymer fluid within the assemblies. The filter media elements may be candle filters or any other suitable filter. Further, each filter housing assembly may include any number of filter media elements (e.g., one filter media element). The bleed line for each filter housing assembly may have any suitable configuration to allow the flow of fluid from the housing chamber of an assembly. The bleed line may further be automated or manually operated.

The filter support structure may be made of any suitable materials and may have any suitable configuration for supporting any number of filter housing assemblies and valve assemblies. The filter support structure may further include any number of inlet and outlet passages and filter input and filter output channels to correspond with filter housing assemblies attached to the filter support structure.

The valve assembly may be made of any suitable materials and may have any suitable configuration for supporting a movable valve on or in the filter support structure while maintaining a fluid tight relationship therebetween. The valve of the valve assembly may be manipulated in any suitable manner to achieve any number of suitable valve positions for diverting fluid flow within the system. For example, instead of a slide valve, the valve assembly may include a spool valve or a disc valve to divert polymer fluid from at least one filter housing assembly to another. The valve assembly may further include any suitable valve position indicator and may be automated or manually operated.

The dimensioning and spacing of the elongated apertures for the filter input and output channels as well as the corresponding grooves for the valve may have any suitable dimensions as well as any suitable spacing arrangement with respect to each other to facilitate fluid communication with the valve at varying valve positions. For example, intermediate valve positions as described above may be obtained by varying the dimensions and spacing of the grooves on the valve rather than providing shorter dimensions for the elongated apertures of the filter output channels in comparison with the elongated apertures of the filter input channels on the main block upper surface.

The filter housing assemblies, valve assembly and filter support structure may include any number of heating elements having any suitable configurations and disposed at any suitable, locations on or in those system components. The heating elements of the system may further be monitored and controlled by a single controller or a plurality of controllers.

The filtration system of the present invention is useful in filtering molten polymer fluids as well as polymer solutions in suitable solvents in a variety of textile or other applications. It is further noted that the system of the present invention is not limited to filtering polymer fluids but is capable of filtering many different types of fluids in a continuous process.

Having described preferred embodiments of a filtration system utilizing a single valve to direct fluid streams between filter housing assemblies, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A continuous fluid filtration system comprising:
   a filter support including an inlet passage to receive fluid entering said system and an outlet passage to deliver filtered fluid out of said system;
   a first filter housing assembly and a second filter housing assembly connected to said filter support, each filter housing assembly including a chamber disposed therein, filter media disposed within said chamber, an input port to deliver fluid into said chamber, an output port to deliver filtered fluid out of said chamber, and a housing head located at one end of each filter housing assembly, wherein said input and output ports of each filter housing assembly are disposed on said housing head of each filter housing assembly; and
   a single valve configured to selectively alternate fluid flow between said first and second filter housing assemblies by establishing fluid communication between said inlet passage and one of said input ports of said first and second filter housing assemblies and between said outlet passage and a corresponding one of said output ports of said first and second filter housing assemblies, wherein said valve includes an engaging surface that engages an outer planar surface of said filter support, said valve is configured to be slidably displaced in two opposite linear directions and along said outer planar surface to selectively alternate fluid flow between said first and second filter housing assemblies, and each slidable displacement of said valve results in movement of said valve spatially closer toward one of said first and second filter housing assemblies and further away from the other of said first and second filter housing assemblies.

2. The system of claim 1, wherein said valve is adjustable to an intermediate position permitting fluid flow to said first and second filter housing assemblies from said inlet passage while preventing fluid flow from one of said first and second filter housing assemblies to said outlet passage.

3. The system of claim 1, wherein said valve is adjustable to a plurality of valve positions that vary fluid flow within said system, and each valve position to which said valve is adjustable permits fluid flow into and out of at least one of said first and second filter housing assemblies.

4. The system of claim 1, wherein said housing head including said input and output ports for each of said first and second filter housing assemblies engages a second surface of said filter support, and said filter support includes a plurality of filter input channels and a plurality of filter output channels extending within said filter support and emerging from said filter support at said second surface, each input port of said first and second housing assemblies is in fluid communication with a corresponding filter input channel and each output port of said first and second filter housing assemblies is in fluid communication with a corresponding filter output channel.

5. The system of claim 4, wherein said filter input channels and said filter output channels emerge from said first surface of said filter support, said valve includes an inlet groove and an outlet groove disposed on said engaging surface, and said valve selectively alternates fluid flow between said first and second filter housing assemblies by aligning said inlet groove and said outlet groove on said second surface such that said inlet groove is in fluid communication with said inlet passage and one of said filter input channels and said outlet groove is in fluid communication with said outlet passage and one of said filter output channels.

6. The system of claim 1, wherein each filter housing assembly includes a bleed line to release air entrapped within said chamber of said filter housing assembly.

7. The system of claim 1, wherein said filter media within said chamber of each filter housing assembly comprises a plurality of candle filters.

8. The system of claim 7, wherein each candle filter of each filter housing assembly receives polymer fluid entering said chamber from said input port and each filter housing assembly further includes a passage in fluid communication with said plurality of candle filters to deliver filtered polymer fluid from said plurality of candle filters to said output port.

9. The system of claim 1, wherein each filter housing assembly includes a heating element to maintain each filter housing assembly at a desired temperature.

10. The system of claim 9, wherein each heating element comprises a heating jacket surrounding an exterior surface portion of a corresponding filter housing assembly.

11. The system of claim 10, wherein each heating jacket includes a temperature sensor to detect the temperature of said corresponding filter housing assembly, and said temperature sensor and said heating jacket are in communication with a controller that controls the temperature of said heating jacket based upon a temperature measured by said temperature sensor.

12. The system of claim 1, wherein said filter support and said valve each include a heating element to maintain said filter support and said valve at desired temperatures.

13. The system of claim 1, wherein each filter housing assembly further includes a housing removably secured to said housing head, said housing including said chamber disposed therein, and said housing head is configured to receive a plurality of different sized housings having different chamber volumes to accommodate varying fluid filtering capacities.

14. A continuous fluid filtration system comprising:
- a filter support including an inlet passage to receive fluid entering said system and an outlet passage to deliver filtered fluid out of said system;
- a first filter housing assembly and a second filter housing assembly connected to said filter support, each filter housing assembly including a chamber disposed therein, filter media disposed within said chamber, an input port to deliver fluid into said chamber, an output port to deliver filtered fluid out of said chamber, and a housing head located at one end of each filter housing assembly, wherein said input and output ports of each filter housing assembly are disposed on said housing head of each filter housing assembly; and
- a single valve configured to selectively alternate fluid flow between said first and second filter housing assemblies by establishing fluid communication between said inlet passage and one of said input ports of said first and second filter housing assemblies and between said outlet passage and a corresponding one of said output ports of said first and second filter housing assemblies, wherein said valve includes an engaging surface that engages an outer planar surface of said filter support, and said valve is configured to be slidably displaced in two opposite linear directions and along said outer planar surface to selectively alternate fluid flow between said first and second filter housing assemblies.

* * * * *

UNITED STATES PATENT AND TRADEMARK OFFICE
CERTIFICATE OF CORRECTION

PATENT NO. : 7,309,430 B2 Page 1 of 1
APPLICATION NO. : 10/296249
DATED : December 18, 2007
INVENTOR(S) : William H. Hills It is certified that error appears in the above-identified patent and that said Letters Patent is hereby corrected as shown below:

Front Page of Patent, (22) PCT Filed:

Change "Dec. 9, 2002" to -- July 18, 2001 --

Signed and Sealed this

Sixth Day of May, 2008

JON W. DUDAS
*Director of the United States Patent and Trademark Office*